United States Patent
Isselhardt et al.

(10) Patent No.: US 9,843,766 B2
(45) Date of Patent: Dec. 12, 2017

(54) VIDEO COMMUNICATION DEVICE AND OPERATION THEREOF

(71) Applicant: Samsung Electronics Co., Ltd., Gyeonggi-Do (KR)

(72) Inventors: Dion M. Isselhardt, Saratoga, CA (US); Garret Miller, San Jose, CA (US); Kyle Brocklehurst, Mountain View, CA (US); Moe Tanabian, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/944,424

(22) Filed: Nov. 18, 2015

(65) Prior Publication Data

US 2017/0064250 A1 Mar. 2, 2017

Related U.S. Application Data

(60) Provisional application No. 62/211,639, filed on Aug. 28, 2015.

(51) Int. Cl.
*H04N 7/14* (2006.01)

(52) U.S. Cl.
CPC .................................. *H04N 7/147* (2013.01)

(58) Field of Classification Search
USPC ......... 348/14.01, 14.07, 14.11, 14.12, 14.16, 348/14.08; 455/456.1, 456.3, 457
See application file for complete search history.

(56) References Cited

U.S. PATENT DOCUMENTS

| | | | |
|---|---|---|---|
| 8,063,929 B2 | 11/2011 | Kurtz et al. | |
| 8,159,519 B2 | 4/2012 | Kurtz et al. | |
| 8,269,822 B2 | 9/2012 | Zalewski | |
| 8,292,433 B2 | 10/2012 | Vertegaal | |
| 8,520,050 B2 | 8/2013 | Blackburn et al. | |

(Continued)

FOREIGN PATENT DOCUMENTS

| | | |
|---|---|---|
| EP | 1626555 A2 | 2/2006 |
| JP | 2008270911 A | 11/2008 |

(Continued)

OTHER PUBLICATIONS

"Perch—Simple Home Monitoring," [online] Perch Technologies [retrieved Nov. 18, 2015] retrieved from the Internet: <https://play.google.com/store/apps/details?id=com.getperch&hl=en>, 2 pg.

(Continued)

*Primary Examiner* — Yosef K Laekemariam
(74) *Attorney, Agent, or Firm* — Cuenot, Forsythe & Kim, LLC

(57) ABSTRACT

A device may include a communication circuitry configured to receive device data from a paired device and a processor coupled to the communication circuitry. The processor may be configured to determine an ambient condition including physical presence of a user of the paired device relative to the paired device using to the device data. The device may also include a screen coupled to the processor. The screen may be configured to display an avatar of the user of the paired device and adjust a visual characteristic of the avatar responsive to the physical presence.

20 Claims, 8 Drawing Sheets

(56) References Cited

U.S. PATENT DOCUMENTS

| | | | |
|---|---|---|---|
| 8,601,379 B2* | 12/2013 | Marks | A63F 13/06 |
| | | | 463/1 |
| 8,723,914 B2 | 5/2014 | Mackie et al. | |
| 8,725,113 B2* | 5/2014 | Gargi | H04M 1/67 |
| | | | 380/247 |
| 8,726,171 B1 | 5/2014 | Lachapelle et al. | |
| 8,885,013 B2 | 11/2014 | Periyannan et al. | |
| 8,963,916 B2 | 2/2015 | Reitan | |
| 2002/0158873 A1 | 10/2002 | Williamson | |
| 2005/0273494 A1 | 12/2005 | Uchide | |
| 2006/0152578 A1 | 7/2006 | Kim | |
| 2008/0254828 A1 | 10/2008 | Kano et al. | |
| 2009/0079813 A1 | 3/2009 | Hildreth | |
| 2011/0004481 A1 | 1/2011 | Jones | |
| 2011/0096140 A1 | 4/2011 | Samadani et al. | |
| 2011/0292181 A1 | 12/2011 | Acharya et al. | |
| 2012/0092441 A1 | 4/2012 | Kong et al. | |
| 2012/0216129 A1 | 8/2012 | Ng et al. | |
| 2013/0027503 A1 | 1/2013 | Hildreth | |
| 2014/0028781 A1 | 1/2014 | MacDonald | |
| 2014/0375752 A1 | 12/2014 | Shoemake et al. | |
| 2015/0215739 A1* | 7/2015 | Lee | A61K 31/167 |
| | | | 455/457 |

FOREIGN PATENT DOCUMENTS

| | | |
|---|---|---|
| KR | 101464431 B1 | 11/2014 |
| KR | 101529222 B1 | 6/2015 |
| KR | 20170026271 A | 3/2017 |
| WO | 2010023963 A1 | 3/2010 |
| WO | 2017039250 A1 | 3/2017 |

OTHER PUBLICATIONS

"Meet ILY, the Family Phone," [online] Copyright ILY [retrieved Nov. 18, 2015] retrieved from the Internet: <https://www.ily.co/>, 6 pg.

WIPO Appln. PCT/KR2016/009551, International Search Report and Written Opinion, dated Dec. 1, 2016, 11 pg.

\* cited by examiner

VIDEO COMMUNICATION DEVICE AND OPERATION THEREOF

CROSS-REFERENCE TO RELATED APPLICATIONS

This application claims the benefit of U.S. Provisional Patent Application No. 62/211,639 filed on Aug. 28, 2015, which is fully incorporated herein by reference.

TECHNICAL FIELD

This disclosure relates to video communication and, more particularly, to a video communication device that provides cues for ambient conditions.

BACKGROUND

Video calls have become increasingly popular. The growth of video calls has outpaced most other forms of communication. Available hardware solutions for video calls, however, tend to be difficult and awkward for users to operate. As a result, many potential video call users turn to other older, less immersive and more familiar forms of communication such as phone calls or the like.

One impediment to video calling has been that many of the devices routinely used for conducting video calls are either multipurpose devices or are devices whose primary function is something other than conducting video calls. As an example, most users conduct video calls using a smart phone, a tablet, a laptop, or other multipurpose computing device. This means that the devices often require a significant amount of setup such as software installation, user registration, hardware adjustment, searching for other devices to communicate with, and the like. Another impediment to video calling is that these sorts of devices tend to have awkward form factors. This leads to poor ergonomics during use by the user. The devices are simply uncomfortable to hold and use while conducting a video call. Available devices are unable to provide a satisfying and immersive video call experience.

SUMMARY

An embodiment may include a device. The device may include a communication circuitry configured to receive device data from a paired device and a processor coupled to the communication circuitry. Using the device data, the processor may be configured to determine an ambient condition including physical presence of a user of the paired device relative to the paired device. The device may also include a screen coupled to the processor. The touch may be configured to display an avatar of the user of the paired device and adjust a visual characteristic of the avatar responsive to the physical presence.

Another embodiment may include a method of communication. The method may include receiving, using a processor of a first device, device data from a second device paired with the first device and determining, using the processor, an ambient condition including physical presence of a user of the second device in relation to the second device using the device data. The method may include displaying, on a screen of the first device, an avatar of the user of the second device and adjusting a visual characteristic of the avatar on the screen responsive to the physical presence.

A computer program product includes a computer readable storage medium having program code stored thereon. The program code may be executable by a processor to perform a method including the various operations described herein.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIGS. 11-1 and 11-2, taken collectively, illustrate an example of shifting window position responsive to the visual perspective of a user.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to video communication and, more particularly, to a video communication device that provides cues for ambient conditions. In accordance with the inventive arrangements disclosed herein, a video communication device is provided that is able to provide cues indicating ambient conditions including physical presence for users of other paired devices. The video communication device may also provide cues indicating other ambient conditions surrounding other paired devices to be described herein. The cues provided by the video communication device indicate a likelihood that a user of the other paired device is available for a video call and/or will participate in a video call.

In one aspect, the video communication device may be dedicated solely for use in conducting video calls. In one exemplary arrangement, the video communication device may be pre-paired with at least one other video communication device. Video devices that are pre-paired with one another may be sold in groups of two or more, e.g., as a pair. As each video communication device is powered on, the pre-paired video communication devices may automatically establish a communication link with each other without the users of the video communication devices having to perform any setup for pairing.

In still another aspect, the video communication device may remain in an "always on" state. The video communication device may remain in a powered on state to facilitate ease of use by the user. As the video communication device establishes the communication link with the paired device, the paired video communication devices may exchange information relating ambient conditions such as user presence surrounding each of the video communication devices. The data may be exchanged over the communication link without establishing a video call. Responsive to the exchanged data, each respective paired video communication device may convey cues relating to detected ambient conditions for the other paired video communication device. Further aspects of the inventive arrangements will be described in greater detail with reference to the drawings below.

Figure 1:
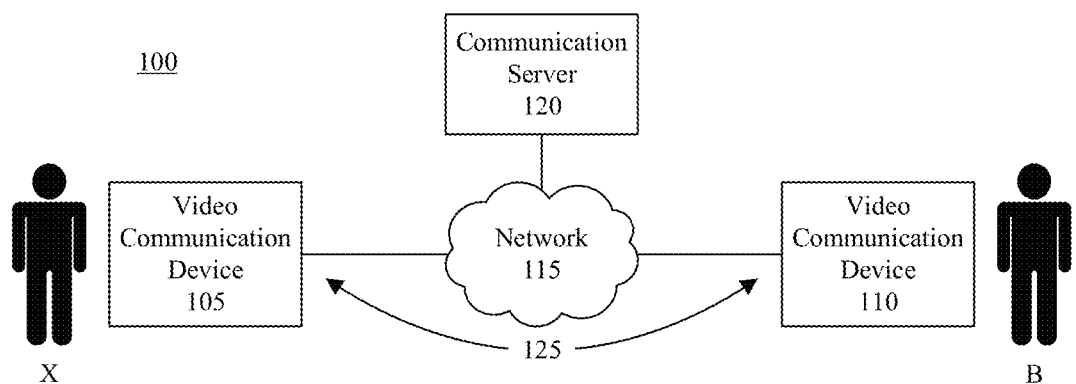
FIG. 1 is a block diagram illustrating an exemplary video calling platform.

FIG. 1 is a block diagram illustrating an exemplary video calling platform (platform) 100. As pictured, platform 100 may include a video communication device (device) 105 and a video communication device (device) 110. For purposes of description, device 105 is associated with a user X; and, device 110 is associated with a user B. Device 105 and device 110 may be communicatively linked through a network 115. Platform 100 may also include a communication server 120.

Network 115 is the medium used to provide communications links between various devices and data processing systems connected together within platform 100. Network 115 may include connections, such as wire, wireless communication links, or fiber optic cables. Network 115 can be implemented as, or include, any of a variety of different communication technologies such as a WAN, a LAN, a wireless network, a mobile network, a Virtual Private Network (VPN), the Internet, the Public Switched Telephone Network (PSTN), or the like. It should be appreciated that devices 105 and 110 may be coupled to network 115 through a wireless connection, a wired connection, and/or a combination of wireless and wired connections.

Communication server 120 may be implemented as a data processing system executing suitable software such as an operating system and one or more other computer programs. Communication server 120 may be configured to provide functions such as authentication and verification to support the establishment of communication links, data exchange, and/or video calls between device 105 and device 110.

Device 105 and device 110 may be paired with one another. In general, pairing is a process used in communication networks where an initial connection between devices is established to allow communication between the paired devices. Pairing may be used in peer-to-peer networks, for example. Referring to FIG. 1, device 105 and device 110 may be configured to pair with one another at or around the time of manufacture or thereafter and prior to availability (e.g., sale) to a user such as user X and/or user B. As both device 105 and device 110 are powered on, each of devices 105 and 110 may join a network, e.g., a local network, and automatically establish a communication link 125 over network 115. It should be appreciated, however, that devices 105 and/or device 110 may be manually configured to pair with one or more other devices as may be desired.

In one arrangement, device 105 and device 110 may utilize technologies such as Universal Plug and Play (UPnP), Multicast Domain Name Service (mDNS), Simple Service Discovery Protocol (SSDP), and the like to facilitate fast, simple, and/or automatic setup. Accordingly, user X and user B do not have to set up either device 105 or device 110 for pairing in order establish communication link 125. Device 105 and device 110 each may be plug-and-play requiring little or no configuration in order to perform the operations described herein. It should be appreciated that in some cases, the user of a device may need to provide a password for device 105 and/or 110 to join a local network. In other cases, a user may select an avatar as a representation of himself and/or herself.

In one arrangement, device 105 and device 110 may remain in an "always on" state even when not engaged in a video call. As such, each of devices 105 and 110 may continually detect ambient data. Device 105, for example, may capture ambient data and send the ambient data as, or as part of, device data to device 110. Device 110 may capture ambient data and send the ambient data as, or as part of, device data to device 105. Data received by device 105 from device 110 may be visualized on the screen of device 105. Similarly, data received by device 110 from device 105 may be visualized on the screen of device 110.

The visualization of exchanged ambient data as described within this disclosure, particularly when not engaged in a video call, provides quick and instantaneous connections among users of paired devices, e.g., friends, family members, or the like. Family and friends that are connected by paired devices are able to more naturally "feel" each other's presence through the visualization of ambient data, e.g., proximity visualization and other visualizations described herein, facilitating a shared digital space.

Figure 2:
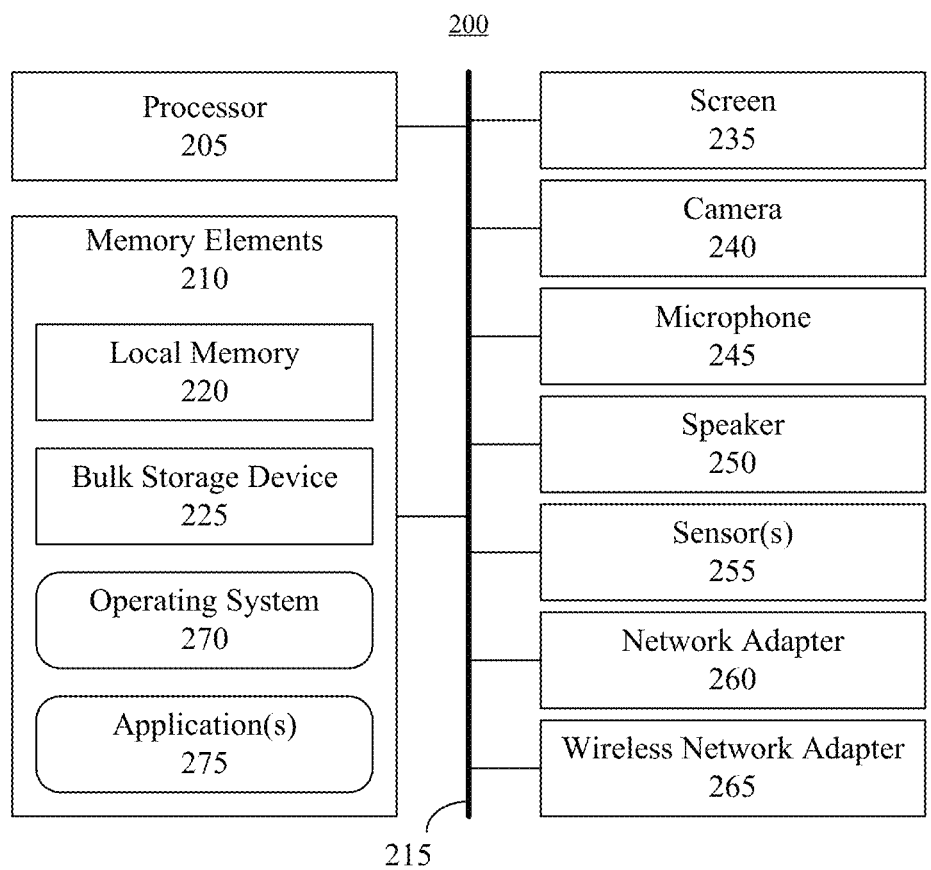
FIG. 2 is a block diagram illustrating an exemplary architecture for a video communication device.

FIG. 2 is a block diagram illustrating an exemplary architecture 200 for a video communication device. Architecture 200 may be used to implement device 105 and/or device 110 of FIG. 1.

As pictured, architecture 200 includes at least one processor, e.g., a central processing unit (CPU), 205 coupled to memory elements 210 through a system bus 215 or other suitable circuitry. Architecture 200 may store program code within memory elements 210. Processor 205 may execute the program code accessed from memory elements 210 via system bus 215. Memory elements 210 may include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 may also include one or more cache memories (not shown) that provide temporary storage of at least some program code in order to reduce the number of times program code must be retrieved from bulk storage device 225 during execution.

Architecture 200 may include one or more input/output (I/O) devices. The I/O devices may be coupled to architecture 200 either directly or through intervening I/O controllers. For example, the I/O devices may also include a screen 235, a camera 240, one or more microphones 245 or other audio input transducer(s), one or more speakers 250 or other audio output transducer(s), and optionally one or more additional sensors 255. In one aspect, screen 235 may be a touch sensitive screen that may detect user touches and/or stylus contact. Exemplary sensors 255 may include, but are not limited to, a Global Positioning System receiver, an accelerometer, a gyroscope, a light sensor such as an ambient light sensor or other optical electronic device, or the like. The light sensor may be implemented as camera 240 or as a separate and independent sensor.

The I/O devices may also include communication circuitry including, but not limited to, a network adapter 260 and/or a wireless network adapter 265. Network adapter 260 and/or wireless network adapter 265 (hereafter collectively referred to as "network adapter(s)") may also be coupled to architecture 200 to enable architecture 200 to become coupled to other systems, computer systems, remote printers, and/or remote storage devices through intervening private or public networks. Modems, cable modems, and Ethernet cards are examples of different types of network adapter 260 that may be used with architecture 200. Wireless radios such as long range transceivers (e.g., mobile transceivers) and short range transceivers (e.g., Bluetooth compatible transceivers, 802.11x compatible transceivers, etc.) are examples of wireless network adapter 265 that may be included.

In some arrangements, architecture 200 may include only network adapter 260. In other arrangements, architecture 200 may include only wireless network adapter 265. In still other arrangements, and as pictured, architecture 200 may include both network adapter 260 and wireless network adapter 265.

Architecture 200 may include a power source whether a power supply intended to plug into an outlet or other electrical connector, a battery, or both a battery and a power source that may also be configured to charge the battery. For ease of illustration, the power source is not illustrated in FIG. 2.

As pictured in FIG. 2, memory elements 210 may store an operating system 270 and one or more applications 275. In one aspect, operating system 270 and application 275, being implemented in the form of executable program code, are executed by architecture 200, i.e., by processor 205. As such, operating system 270 and application 275 may be considered an integrated part of architecture 200. Operating system 270, application 275, and any data items used, generated, and/or operated upon by architecture 200 are functional data structures that impart functionality when employed as part of a system implemented using architecture 200.

As noted, in one aspect, devices 105 and/or 110 may be dedicated video communication devices. In such an embodiment, the devices may not include any other applications or program code other than applications and/or program code that implement the various operations described within this disclosure.

As defined within this disclosure, the term "ambient" means of or relating to the immediate surroundings for a point of reference such as device 105 and/or 110. Ambient data includes visual data such as images and/or video as captured by camera 240. Ambient data may include audio-visual data as captured by camera 240 and/or microphone 245. Ambient data may include audio as captured by microphone 245. Ambient data may also include data generated from one or more other sensors of the device. Other examples of ambient data may include, but are not limited to, a particular amount of light, whether low (dim) or high (bright), and the like as determined from camera 240 and/or one or more of sensors 255. Device data includes ambient data. Device data, however, may also include one or more additional data items.

Figure 3:
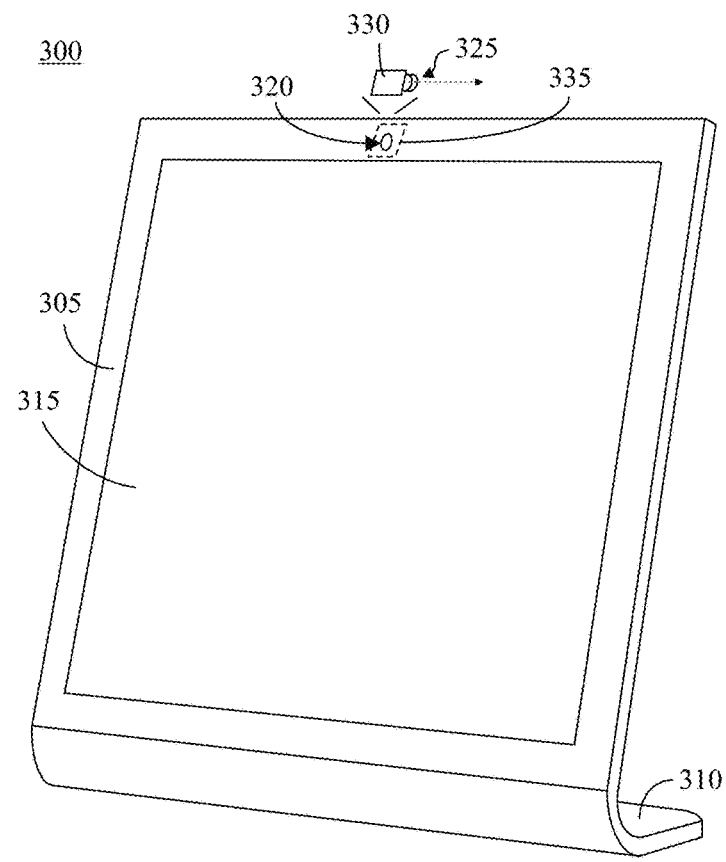
FIG. 3 is a perspective view of an exemplary video communication device.

FIG. 3 is a perspective view of an exemplary video communication device (device) 300. In one aspect, device 300 may be similar to, or the same as, device 105 and/or device 110 of FIG. 1. Device 300 may be implemented with a case 305 having a base portion 310. Within case 305, device 300 may include an architecture as described with reference to FIG. 2. Case 305 may surround or encompass a screen 315. As pictured, device 300 may be implemented as a free-standing device that may be used in a hands-free manner since the user need not hold device 300 while conducting a video call.

Screen 315 may be a touch sensitive screen. Case 305 may be formed with an opening 320. A camera 325 may be mounted behind opening 320 facing out from case 305 through opening 320. Camera 325 may have a field of view that extends outward from opening 320 and screen 315 so as to capture users and/or objects positioned to view screen 315. In one arrangement, camera 325 may be implemented as a wide angle camera or a camera fitted with a wide angle lens.

In another arrangement, device 300 may include a manually operated lens cover 330. Lens cover 330 may be moveably mounted in front of camera 325. In one aspect, lens cover 330 may be controlled using a mechanical switch such as a wheel, slider, or the like. The mechanical switch may be positioned on the backside of case 305. For example, the mechanical switch may oppose opening 320. It should be appreciated, however, that the mechanical switch may be located on the top of case 305, e.g., directly above lens cover 330, on the front surface of case 305, e.g., next or adjacent to, opening 320.

In any case, lens cover 330 may be moved to an open position that does not block or otherwise obstruct camera 325. Lens cover 330 may also be moved to a closed position that does block and/or obstruct camera 325. As noted, device 300 may remain in an "always on" operational state. In that state, camera 325 may continually monitor for events within the field of view of camera 325. Camera 325, for example, may continually capture visual data for processing and/or sending to a paired device when no video call is taking place. In one arrangement, device 300 may continually capture any and/or all forms of ambient data when no video call is taking place and send the ambient data as device data to another paired device.

In one arrangement, closing lens cover 330 may prevent camera 325 from capturing visual data, e.g., video and/or images. In that case, camera 330 may be completely blocked and unable to capture visual data. For example, lens cover 330 may be made of a material that is completely opaque. In another arrangement, closing lens cover 330 may also deactivate camera 325 and/or a microphone. In still another arrangement, closing lens cover 330 may also prevent device 300 from collecting ambient data and/or sending ambient data to other paired devices. Opening lens cover 330 may activate camera 325 and/or the microphone. Opening lens cover 330 may also activate the collection of ambient data and/or sending of ambient data to other paired devices.

Using lens cover 330 that may be manually opened and/or closed by the user may provide the user with the satisfaction of knowing that no ambient, e.g., visual, data may be captured by device 300 and/or communicated to another device while lens cover 330 is closed. This arrangement may be particularly beneficial as device 300 may remain in an always on state.

Figure 4:
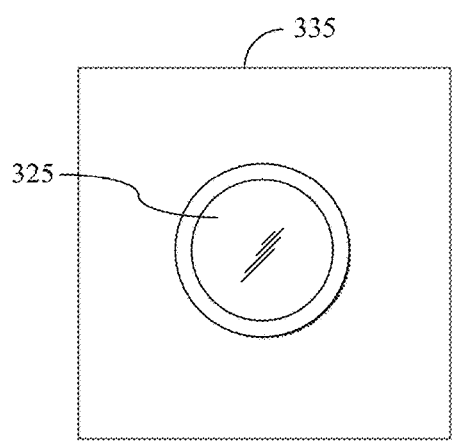
FIG. 4 is a view of portion of the video communication device of FIG. 3.

FIG. 4 is a view of a portion of device 300 of FIG. 3. More particularly, FIG. 4 illustrates region 335 of device 300. FIG. 4 illustrates region 335 where lens cover 330 is open, thereby revealing camera 325. In one arrangement, while lens cover 330 is open, device 300 may be turned on or active. Screen 315, for example, may be active and display information relating to any paired devices and/or users of paired devices while no video call is taking place. Further, device 300 may send ambient data to the paired device. Device 300 may also receive ambient data from the paired device.

Figure 5:
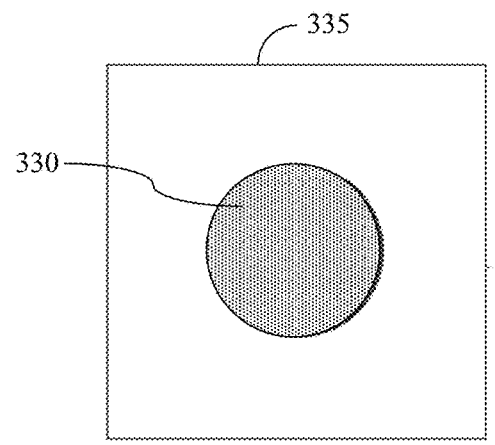
FIG. 5 is another view of the portion of the video communication device of FIG. 3.

FIG. 5 is another view of region 335 of FIG. 3. FIG. 5 illustrates region 335 where lens cover 330 is closed thereby obstructing camera 325. In one arrangement, while lens cover 330 is closed, device 300 may be in a sleep or inactive mode. In one aspect, for example, screen 315 may be turned off or blank. While in the sleep or inactive mode, device 300 may not collect and/or send ambient data. Further, while in the sleep or inactive mode, device 300 may not receive ambient data from any paired devices.

Figure 6:
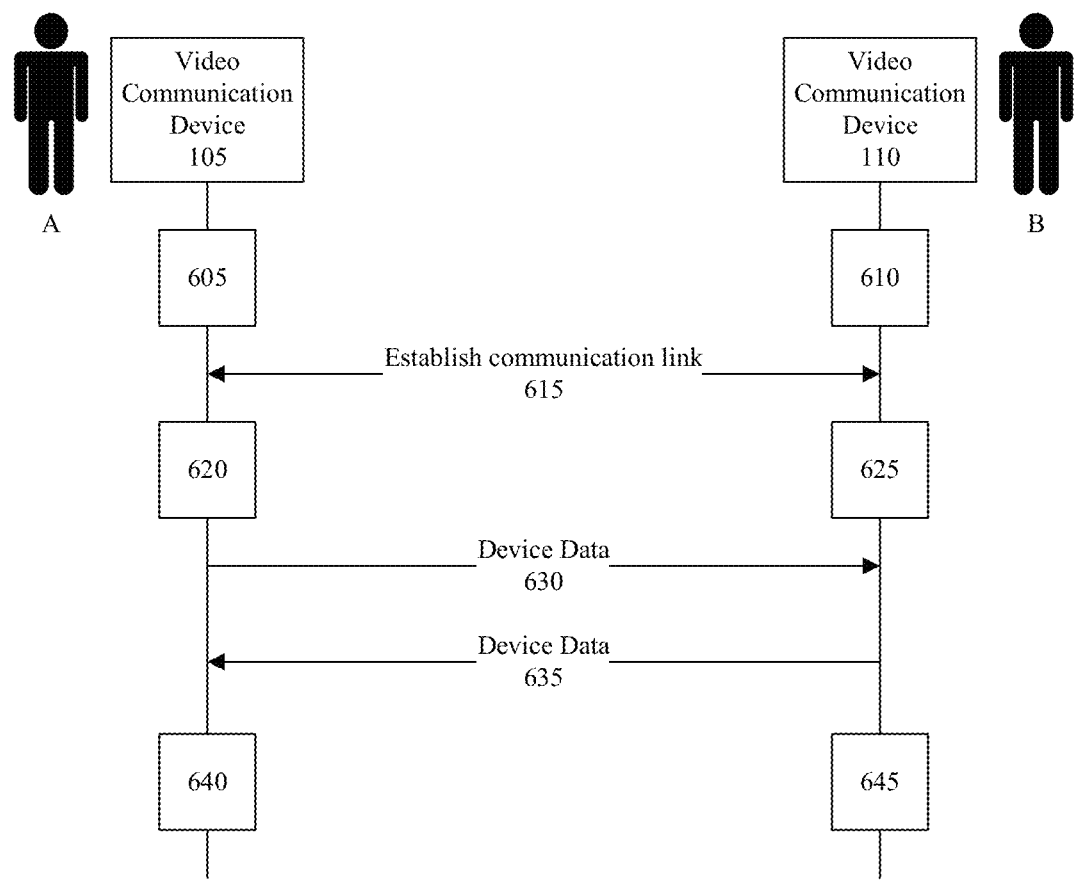
FIG. 6 is a signal flow diagram illustrating an example of data exchange between the devices of the video calling platform of FIG. 1.

FIG. 6 is a signal flow diagram illustrating an example of data exchange between device 105 and device 110 of FIG. 1. As noted, device 105 and device 110 may be pre-paired. The user of each one of devices 105 and 110 may power on the device. Device 105 may undergo a power on procedure 605. Similarly device 110 may undergo a power on procedure 610. While illustrated as taking place at or about the same time, device 105 and device 110 need not be powered on at the same time, though concurrent operation is required.

With device 105 and device 110 powered on, devices 105 and 110 may establish a communication link 615. Devices 105 and 110 may exchange device data over communication link 615. It should be appreciated that while devices 105 and 110 may exchange device data over communication link 615, the existence of communication link 615 is not, by itself, indicative of an active or ongoing video call. Block 620 may represent data collection operations performed by device 105. Block 625 may represent data collection operations performed by device 110. Accordingly, device 105 may send device data 630 collected in block 620 to device 110 without an established video call. As noted, device data 630 may include ambient data. Device 110 may send device data 635 collected in block 625 to device 105 without an established video call. Device data 635 may include ambient data. As noted, ambient data may include, but is not limited to, images, video data, audiovisual data, audio data, light data, and/or other sensor data collected by device 105 and/or device 110.

Block 640 illustrates operations performed by device 105 responsive to receiving device data 635. Block 645 represents processing performed by device 110 responsive to receiving device data 630. For example, device 105 may determine an ambient condition such as physical presence of user B relative to device 110 using device data 635. Further device 105 may determine one or more other ambient conditions from device data 635. Device 110 may determine an ambient condition such as physical presence of user X relative to device 105 using device data 630. Further device 110 may determine one or more other ambient conditions from device data 630.

Figure 7:
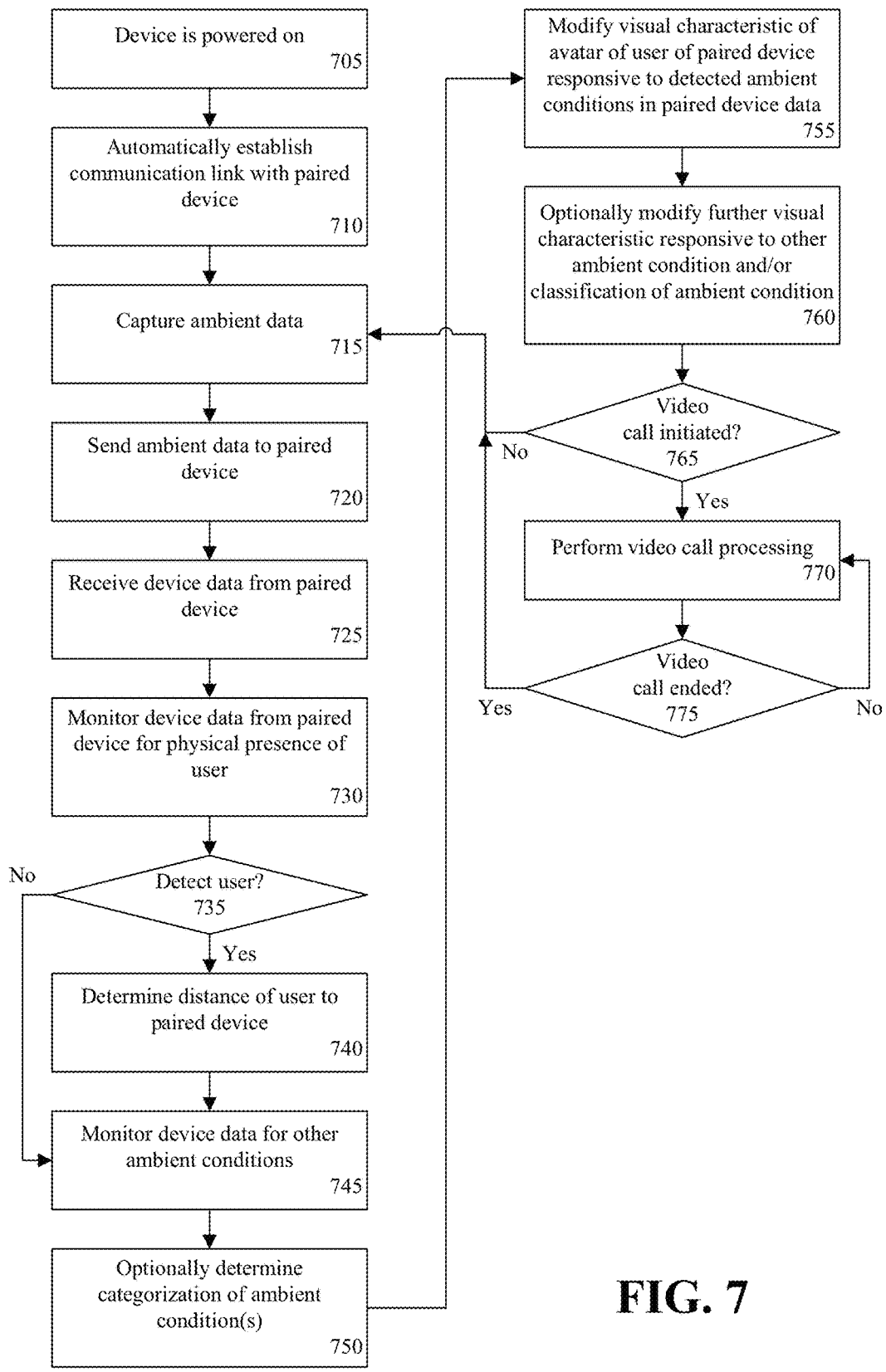
FIG. 7 is a flow chart illustrating an exemplary method of adjusting visual characteristics of an avatar to indicate ambient conditions.

FIG. 7 is a flow chart illustrating an exemplary method 700 of adjusting visual characteristics of an avatar to indicate ambient conditions. FIG. 7 illustrates how adjustment of these visual characteristics provide cues for an ambient condition such as user presence. Method 700 may be performed using a platform as described with reference to FIG. 1. For purposes of illustration, method 700 is described from the perspective of a first device, e.g., device 105, of a set of paired devices.

In block 705, the device is powered on. The paired device may also be powered on or already in a powered on state. In block 710, the device may automatically establish a communication link with the paired device. It should be appreciated that while the device may have established a communication link with the paired device, a video call is not established. Responsive to powering on and establishing the communication link, the device may display an avatar representing a user of the paired device. In one aspect, the device may display the avatar in a default state immediately subsequent to powering on.

In block 715, the device may capture ambient data. The ambient data may include images, video, audiovisual data, and/or data from one or more sensors. In block 720, the device may send the ambient data to the paired device as device data. In block 725, the device may receive device data from the paired device. The device data received from the paired device may be ambient data, as described, as captured and sent by the paired device.

In block 730, the device may monitor the device data received from the paired device for physical presence of a user. As noted, physical presence of a user is one example of an ambient condition. For example, device 105 may analyze the paired device data received from device 110 to determine physical presence of user B relative to device 110. As defined within this disclosure, the term "physical presence" means that the user of a device is detected within a particular range and/or area around the device. In one arrangement, physical presence may mean that the user is within a predetermined distance of the paired device. In another arrangement, physical presence may be that the user is within a field of view of a camera of a device so as to be detected.

For example, a device may determine physical presence of a user by analyzing the received visual data from the paired device. The device may apply image processing to determine whether a user present within the captured images and/or video. The device may use image processing to distinguish between users, e.g., human beings, and objects that are not users. In another example, the device may detect motion of objects. In another exemplary arrangement, the device may be configured to utilize facial recognition technology to determine the identity of a user from among a plurality of potential users that may or may not be determined to be physically present. Facial recognition technology may be useful in cases where a device is located in an environment with multiple users. Accordingly, the device may be able to determine which of a plurality of potential users is physically present in relation to the paired device.

In another example, where facial recognition technology is used, the device may determine whether the user is known to the device. For example, members of a household each may establish an avatar or register themselves as a user of the device. In cases where the device detects a human being that is unknown, the device may capture an image of the unknown user in real time and send the image to any paired devices for use as an avatar for the user on the paired device.

In still another arrangement, the device may analyze the audio within the received device data from the paired device. The device may distinguish among different types of audio. For example, the device may determine whether a voice of a user is detectable within the audio data. Detection of a human voice in the audio data may be an indication of physical presence of a user. Further, the sound level of the voice within the audio data may indicate proximity of the user to the paired device.

In block 735, the device may determine whether a user has been detected. A user may be detected using any of the techniques described and/or combinations of the techniques herein. If a user is detected, method 700 may proceed to block 740. If not, method 700 may continue to block 745. In block 740, the device may determine the distance of the user from the paired device. For example, the device may estimate the distance of the user from the paired device using image processing. The device may be preprogrammed with the attributes of the camera of the paired device thereby allowing the device to calculate an estimate of the distance between a user detected within the visual data and the paired device. In another aspect, the device may estimate distance according to the sound level of a detected user voice. Louder sound levels of voices indicate shorter distances between user and paired device, while softer sound levels indicate greater distance between the user and the paired device.

In block 745, the device may monitor the device data received from the paired device for one or more other ambient conditions around the paired device. The detection of particular ambient conditions and/or combinations of ambient conditions may be used to indicate the likelihood that a user is available to conduct a video call. Another example of an ambient condition is the detection of audio such as a voice of a user, voices of users, and/or music. Another example of an ambient condition is the level of light in and around the paired device. As will be described in greater detail, the detection of physical presence of a user may be used in combination with one or more other ambient conditions to determine a likelihood that a user is available to conduct a video call.

In block 750, the device may optionally categorize the ambient conditions. For example, the device may categorize received audio on a scale indicating the sound level. The device may further categorize the type of audio. Exemplary types of audio may include, but are not limited to, music, voices of users, or the like.

In block 755, the device may modify a visual characteristic of an avatar representing the user of the paired device responsive to the detected ambient conditions in the received device data from the paired device. In one example, the device may modify the visual characteristic of the avatar responsive to physical presence of the user represented by the avatar, e.g., the user of the paired device, as determined in block 735 and/or 740. The device, as noted, may display an avatar representing the user of the paired device on its screen. In one aspect, display of the avatar on the screen of the device may be modified according to the distance of the user from the paired device. For example, the avatar of the user as displayed on the device may be moved, resized, changed in color, or the like. An avatar of a user may be displayed in a default position when the user is not determined to be physically present. The avatar of the user may be continually modified, e.g., moved and/or resized, in real time responsive to physical presence of the user as determined from the device data from the paired device.

In block 760, the device may optionally modify one or more further visual characteristics of the avatar responsive to one or more other ambient conditions determined from the device data. The further visual characteristics provide cues indicating the ambient conditions and/or a classification of the ambient condition(s) detected in the device data received from the paired device. In one aspect, the sound level, e.g., as measured in decibels, may be visualized as a pulsing ring linked to, and/or surrounding, the avatar of the user of the paired device as displayed on the screen of the device. The cue may increase in size and decrease in size in real time as the sound level increases and/or decreases within the device data from the paired device. The visual characteristics of the avatar described herein may be modified concurrently with one another responsive to detected ambient conditions in the device data.

In another arrangement, color of the ring or other visual characteristic may be changed based upon the categorization of the ambient condition. As an example, the ring surrounding the avatar which serves as a cue for music detected at the paired device may be a different color than a ring used to indicate user voices detected at the paired device. In still another example, the ring surrounding the avatar which serves as a cue for the level of light around the paired device may have yet another color. The rings may be continually resized to indicate changing levels of the ambient conditions in real time. Further, rings may be superimposed indicating a plurality of the ambient conditions concurrently. This allows the user of the device to have a sense of the activity level occurring at the paired device and a sense of the type of activity that is occurring at the paired device.

In block 765, the device may determine whether a video call has been initiated. A video call may be initiated by the device, e.g., under user control, or by the paired device under control of the user of the paired device. In one aspect, the device and paired device may support single tap video call initiation. For example, a user of a device may initiate a video call to a paired device by simply touching the avatar of the user of the paired device. If a video call is initiated, method 700 may continue to block 770 to perform video call processing. If a video call is not initiated, method 700 may loop back to block 715 to continue capturing and/or processing ambient data as described. After block 770, method 700 continues to block 775 to determine whether the video call has ended. If so, method 700 may proceed to block 715. If not, method 700 may loop back to block 770 and continue processing until the video call ends.

Figure 8:
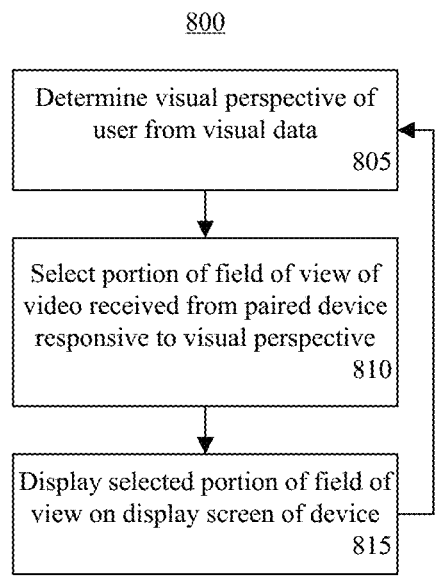
FIG. 8 is a flow chart illustrating an exemplary method of conducting a video call using perspective of a user.

FIG. 8 is a flow chart illustrating an exemplary method 800 of conducting a video call using perspective of a user. Method 800 may be performed by a device such as device 105 and/or 110 during an ongoing video call. For example, method 800 may be implemented by a device such as device 105 as part of, or during, block 770.

In block 805, the device may determine a visual perspective of the user from visual data. For example, device 105 may capture visual data that is to be transmitted to the paired device. Device 105 may analyze the captured visual data and estimate the direction that user X is looking during the video call. Device, for example, may determine whether user X is looking up, down, left, right, or in a direction between the four dominant directions noted.

In block 810, responsive to the visual perspective of the user, the device may select and/or adjust a window position within a field of view of video received from the paired device. The window may define a portion of the field of view of the video received from the paired device that is displayed on the screen of the device during the video call. For example, device 110 may capture video using a wide angle camera that has a field of view that is larger than what is displayed to the user on the screen of device 105. Device 105 may display only portion of the entire field of view of the video received from device 110. The portion of the video displayed may be that within the window, which may be moved or adjusted within the field of view responsive to the visual perspective of user X.

In block 815, the device may display the portion of the field of view of the view within the window on the screen of the device. Method 800 may continue to loop and operate while a video call is ongoing.

Figure 9:
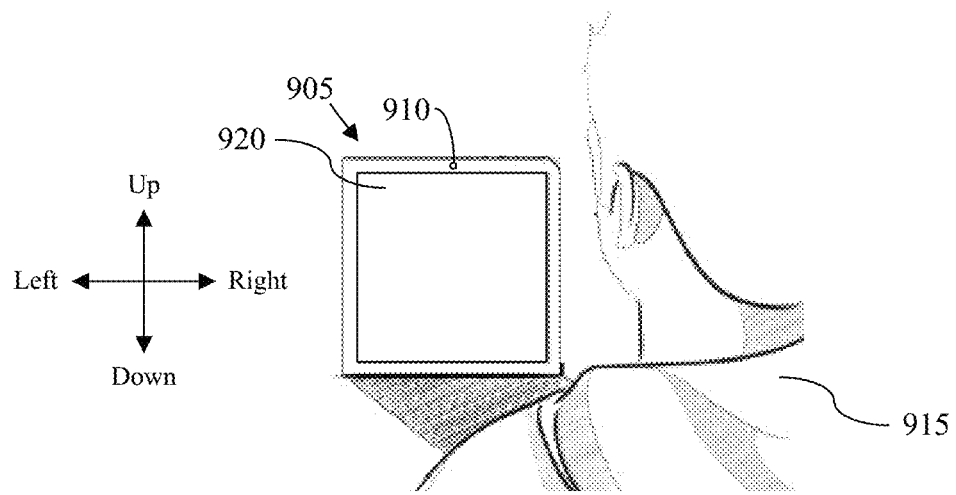
FIG. 9 is a pictorial view illustrating visual perspective of a user.

FIG. 9 is a pictorial view illustrating visual perspective of a user. As pictured, device 905, using camera 910, may capture visual data including user 915. Device 905 may use image processing to determine a visual perspective of user 915 relative to device 905 and camera 910. In one aspect, device 905 may determine the direction and/or orientation of the user's face while conducting a video call. Device 905, for example, may detect whether user 915 has a visual perspective that is directed up, down, center, left, right, or to points in between. Further, device 905 may determine the degree to which the face of user 915 is directed up, down, left, and/or right. In another aspect, device 905 may determine whether user 915 shifts his or her body and/or head in a particular direction. Device 905 may detect the degree to which such a shift occurs.

Despite the particular technique used to determine the visual perspective of user 915, device 905 may continue to determine changes in the visual perspective of the user over time during video calls. The visual perspective of user 915 and/or changes detected in the visual perspective of user 915, may be used to move a window within the field of view of video received from the paired device that is displayed on screen 920.

Figure 10:
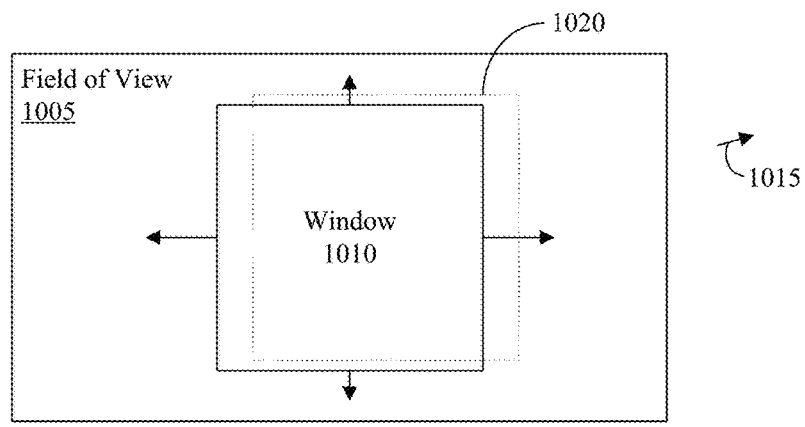
FIG. 10 is a block diagram illustrating the use of visual perspective of a user during a video call.

FIG. 10 is a block diagram illustrating the use of visual perspective of a user during a video call. FIG. 10 illustrates a field of view 1005 of video that is received from a paired device. For example, a wide angle camera of device 110 may capture video having a field of view 1005 as pictured in FIG. 10. The term "field of view," as used within this disclosure, refers to the full size video frames received from a paired device. While no video call is established, device 105 may not display any visual data, e.g., images and/or video, received from the paired device. Device 105, as discussed, however, may analyze the received visual data for purposes of detecting ambient conditions such as physical presence of the user of the paired device and other ambient conditions around the paired device.

During a video call, video having field of view 1005 is sent to device 105 as visual data from device 110. When a video call is established, device 105 may display only portion of field of view 1005 of the received video from device 110 that is within a window 1010. Because window 1010 is sized smaller than field of view 1005, device 105 may adjust the position of window 1010 within field of view 1005 responsive to the changing visual perspective of user X. For example, responsive to determining that user X shifts visual perspective to the right, device 105 may shift the position of window 1010 to the right within field of view 1005. As noted, only the portion of the video within window 1010 is displayed on the screen of device 105. Responsive to determining that user X shifts visual perspective to the left, device 105 may shift window 1010 within field of view 1005 to the left. Responsive to determining that user X shifts visual perspective upward, device 105 may shift window 1010 within field of view 1005 upward. Responsive to determining that user X shifts visual perspective downward, device 105 may shift window 1010 within field of view 1005 downward.

In the example of FIG. 10, device 105 may determine that the visual perspective of user X has shifted in the direction of arrow 1015 (e.g., up and to the right). Thus, device 105 has determined that user is has changed visual perspective and is now looking at a location farther to the right and higher than before. Accordingly, device 105 may shift the position of window 1010 within field of view 1005 to position 1020. Moving and/or adjusting the position of window 1010 changes the portion of video displayed on the screen thereby simulating the changing view one would obtain when looking out a window. In this regard, it should be appreciated that a user may shift one's head to the right, while shifting one's body to the left, which would be interpreted by device 105 as a visual perspective that is directed right, resulting in a shift in position of window 1010 to the right within field of view 1005. This example illustrates that body motion may occur in the opposite, or approximately opposite, direction than the determined direction that one's face is directed for purposes of determining visual perspective of a user.

Device 105 may shift window 1010 around field of view 1005 of the video responsive to detected visual perspective and/or changes in visual perspective of user X. Further, the degree of movement or change in visual perspective of user X may be correlated with the amount that the window is shifted. Larger changes in visual perspective may translate into larger movements of window 1010. Faster changes in visual perspective may translate into larger movement of window 1010.

Figures 1, 11:
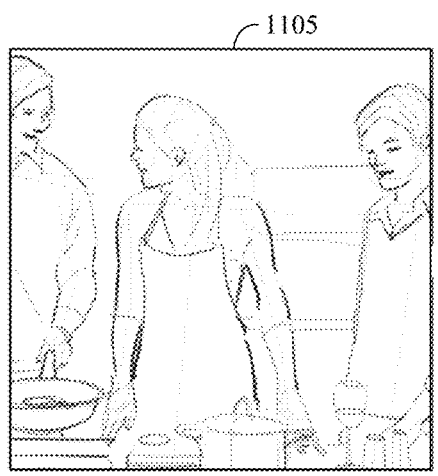
Figures 2, 11:
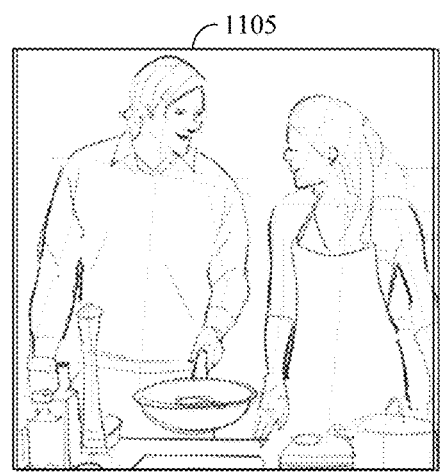

FIGS. 11-1 and 11-2, taken collectively, illustrate shifting window position responsive to user visual perspective. FIG. 11-1 illustrates an initial position of window 1105 displayed on the screen of device 105. As noted, window 1105 is smaller than the field of view of the video received by device 105 from paired device 110 during a video call. In this example, device 105 determines that the visual perspective of user X has shifted to the left. User X has moved in a position and/or shifted his or her face to indicate that he or she is looking farther to the left on the screen of device 105 than before. Responsive to the detected shift in visual perspective of user X, device 105 shifts the position of window 1105 to the left within the field of view of the video received from paired device 110 as illustrated in FIG. 11-2.

Figure 12:
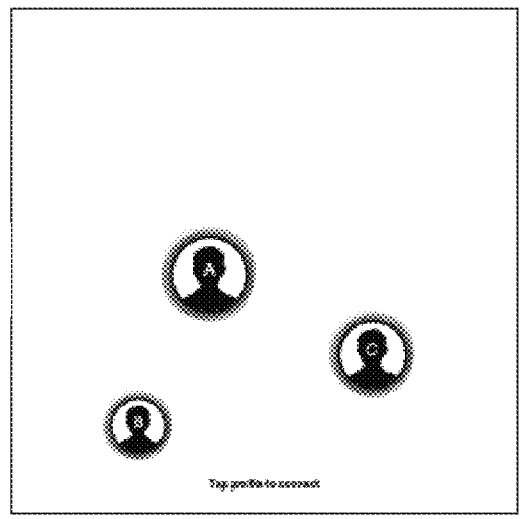
FIG. 12 is an exemplary graphical user interface (GUI) that may be presented on a screen of video communication device.

FIG. 12 is an exemplary graphical user interface (GUI) 1200 that may be presented on a screen of device 105. GUI 1200 may be displayed while device 105 is not engaged in a video call, but is still active (e.g., the lens cover of the camera is open). GUI 1200 shows three avatars corresponding to user A, user B, and user C. Users A, B, and C may be identified by their avatars, which may be customized by each respective user. Each of users A, B, and C further is associated with a paired device. For example, if GUI 1200 is presented by device 105, each of users A, B, and C is associated with a different paired device. For purposes of discussion, the device of user A is referred to as device A, the device of user B as device B, and the device of user C as device C. As discussed, device 105 may receive device data from each of the paired devices A, B, and C.

In one arrangement, device 105 may increase and decrease the size of an avatar based upon the proximity of the user represented by the avatar to the camera of their respective device. For example, responsive to receiving device data from each of paired devices A, B, and C, device 105 may adjust the avatar of users A, B, and C to represent the distance of each user from his or her respective device. In this example, as a user moves closer to his or her device, or is determined to be closer from the device data, the avatar of that user may be enlarged and/or moved closer to the center of GUI 1200 on the screen of device 105. In this example, user A is determined to be physically present with respect to device A. User B is determined to be physically present with respect to device B. User C is determined to be physically present with respect to device C. The distance between user A and device A is less than the distance between user C and device C. Further, the distance between user C and device C is determined to be less than the distance between user B and device B.

In another arrangement, avatars of users of paired devices may be displayed in a default position when the user represented by the avatar is determined not to be physically present to the paired device. For example, the avatar may be displayed with a small or smaller size and positioned on the bottom of the GUI. Further, in the case where avatars of users determined not to be physically present relative to their devices are displayed, such avatars may be visually distinguished from avatars of users determined to be physically present relative to their devices.

Figure 13:
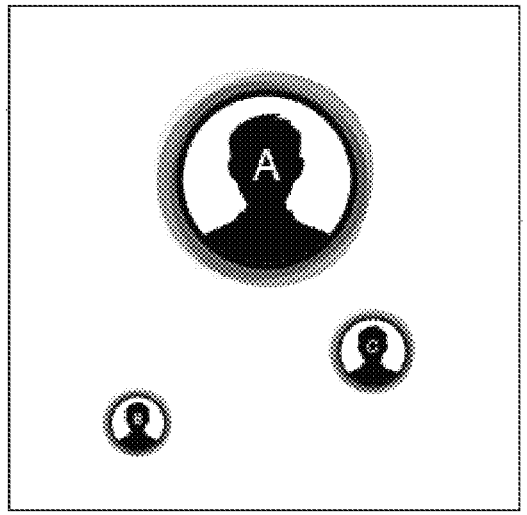
FIG. 13 illustrates another view of the GUI of FIG. 12.

FIG. 13 illustrates another view of GUI 1200. As pictured, the avatar representing user A has moved more toward the center of GUI 1200 and is larger than was the case in FIG. 12. This modification of the visual characteristic of avatar of user A, e.g., size and position in this example, indicates that user A is now closer to device A than was the case in FIG. 12.

Device 105 may modify one or more further visual characteristics of the avatars according to ambient data. Visual characteristics of the avatars may be adjusted through color and/or shape to indicate character of the audio, the nature of the audio, a particular sound, random noise, people talking, or the like. In the examples of FIGS. 12 and 13, further visual characteristics are illustrated as rings that surround each respective avatar. As discussed, the rings may be adjusted dynamically in size, color, or the like responsive to ambient data received from devices A, B, and C. The color and/or size of the rings may indicate the volume of sound detected and/or the category of sound detected, level of light, and the like.

For example, the louder the sound level of audio received from device A, the larger the rings expand outward from the avatar for user A. Similarly, color of the rings may be adjusted to indicate the type of audio that is detected. One color may indicate music, while another color may indicate voices of users. As such, user X of device 105 may determine the level of activity occurring at the location of devices A, B, and/or C in real time. User X of device 105 may be cued to high levels of activity as indicated by the larger size of the avatar for user A, larger sized rings, color, and the like. The ring size may be expanded or contracted to indicate whether the surroundings of a device are bright or dark. The combination of visual characteristics are indicative of whether the user of a paired device is more or less likely to communicate and/or engage in a video call.

In illustration, user X of device 105 may view the avatar for user A and see that music is playing or that high levels of sound have been detected at the location of device A.

Further, since the avatar of user A is larger, the user of device 105 may conclude that user A is very close to device A. The high levels of sound and classification may indicate to the user of device 105 that a celebration or party is taking place and, as a result, cause the user of device 105 to initiate a video call. In another example, the position and/or size of the avatar of a user may indicate that the user is near his or her device, which may prompt the user of device 105 to start a video call for a quick chat based solely on the cues obtained from device 105. The inventive arrangements disclosed herein help to remove the friction points typically found with video conferencing to allow more natural and spontaneous use of video calls.

Figure 14:
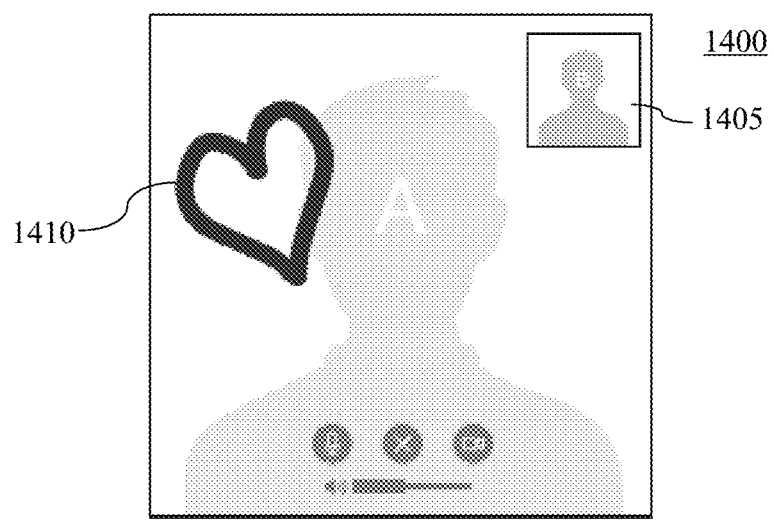
FIG. 14 is another exemplary GUI that may be presented on a screen of a video communication device.

FIG. 14 is another exemplary GUI 1400 that may be presented on a screen of device B. GUI 1400 may be displayed while device B is engaged in a video call. In the example of FIG. 14, user A and user B of devices A and B, respectively, are engaged in a video call. User B is able to view a picture-in-picture view of the scene, or a portion thereof, captured by the camera of device B shown in window 1405. In the example of FIG. 14, user A has provided a user input by drawing a heart shape on the screen of device A. Concurrent with the video call, device A may send the detected user inputs to device B. Device B, responsive to receiving the user inputs from device A, may render the user input on the screen of device B shown as a graphic (a heart shape in this example) 1410. Device B, for example, may overlay the graphic on the video received from device A during the video call.

In one arrangement, drawing 1410 may be removed from the screen of device B after a predetermined amount of time. In one aspect, device B may display graphic 1410 and begin fading graphic 1410 after a first predetermined amount of time, with image 1410 eventually disappearing entirely from the display of device B after a second predetermined amount of time.

It should be appreciated that while described from the perspective of providing an image received at device A to device B, the process may also operate in the reverse direction. For example, device B may detect a user input from user B and provide the user input to device A concurrently with a video call so that device A may overlay an image specified by the user input from user B as described. Further, both user A and user B may provide inputs to their respective devices that may be exchanged concurrently with one another while on a video call with one another.

In another arrangement, drawings may be sent from one device to another paired device using gestures. As defined within this disclosure, the term "gesture" means a predetermined motion of a body or portion of a body. A gesture may be a detected motion of a hand, arm, or user's entire body in a predetermined way. A gesture may be detected using a camera. A gesture may also be detected using a touch sensitive screen or other touch sensitive input device where the pattern of motion, the number of contact points, or both may be detected as a gesture. Each of one or more gestures may be associated with an image or graphic. Responsive to device A detecting user A making a gesture, device A may send the graphic associated with the detected gesture to device B during a video call.

In another arrangement, the device may be placed in a mode where a video call remains established in order to provide video monitoring and/or a security camera function. In this mode of operation, device A, for example, may continually receive and display audiovisual information from device B.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "avatar" means an icon, figure, or image representing a user.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

An embodiment may include a device. The device may include a communication circuitry configured to receive device data from a paired device, a processor coupled to the communication circuitry and configured to determine a first ambient condition including physical presence of a user of the paired device relative to the paired device using to the device data, and a screen coupled to the processor and configured to display an avatar of the user of the paired device and adjust a visual characteristic of the avatar responsive to the physical presence. The screen may be a touch sensitive screen.

The physical presence may indicate a change in distance between the user of the paired device and the paired device. The screen may adjust the visual characteristic of the avatar responsive to the change in distance.

The visual characteristic may indicate a likelihood of the user of the paired device accepting a communication.

The processor may determine a second ambient condition for the paired device from the device data. The screen may adjust a further visual characteristic of the avatar responsive to the second ambient condition.

The processor may determine a categorization of the second ambient condition. The further visual characteristic may indicate the categorization of the second ambient condition. In one aspect, the second ambient condition may include sound level. In another aspect, the second ambient condition may include ambient light.

The device may include a camera configured to capture visual data of surroundings of the device. The communication circuitry may be further configured to send the visual data to the paired device.

In another arrangement, during a video call, the processor may be configured to determine a visual perspective of a user of the device according, at least in part, to the visual data, and adjust a position of a window within a field of view of video received from the paired device displayed on the screen responsive to the visual perspective of the user of the device.

In still another arrangement, the screen may display video received from the paired device during a video call and overlay a graphic on the video during the video call responsive to a user input detected from the user of the paired device. The graphic may be specified by the user input.

Another embodiment may include a method of communication. The method may include receiving, using a processor of a first device, device data from a second device paired with the first device, determining, using the processor, a first ambient condition including physical presence of a user of the second device in relation to the second device using the device data, displaying, on a screen of the first device, an avatar of the user of the second device, and adjusting a visual characteristic of the avatar on the screen responsive to the physical presence. The screen may be a touch sensitive screen.

The device data may specify a change in distance between the user and the second device. Adjusting a visual characteristic may include adjusting the visual characteristic of the avatar responsive to the change in distance.

The visual characteristic of the avatar may indicate a likelihood of the user of the paired device accepting a communication.

The method may include determining a second ambient condition for the paired device from the device data and adjusting a further visual characteristic of the avatar responsive to the second ambient condition.

The method may include determining a categorization of the second ambient condition. The visual characteristic may indicate the categorization of the second ambient condition. In one aspect, the second ambient condition may include a sound level. In another aspect, the second ambient condition may include ambient light.

The method may include capturing visual data of surroundings of the device using a camera and sending the visual data to the paired device.

The method may also include, during a video call, determining a visual perspective of a user of the device according, at least in part, to the visual data and adjusting a position of a window within a field of view of video received from the paired device displayed on the screen responsive to the visual perspective of the user of the device.

The method further may include displaying video received from the paired device during a video call and overlaying a graphic on the video during the video call responsive to a user input detected from the user of the paired device, wherein the graphic is specified by the user input.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A device, comprising:
    a communication circuitry configured to receive device data from a paired device;
    a processor coupled to the communication circuitry and configured to determine a first ambient condition comprising physical presence of a user of the paired device relative to the paired device based on image processing of the device data from the paired device; and
    a screen coupled to the processor and configured to display an avatar of the user of the paired device and adjust a visual characteristic of the avatar responsive to the physical presence;
    wherein the visual characteristic of the avatar is adjusted on the screen of the device prior to establishing a video call with the paired device.

2. The device of claim 1, wherein:
    the physical presence indicates a change in distance between the user of the paired device and the paired device; and
    the screen adjusts the visual characteristic of the avatar responsive to the change in distance.

3. The device of claim 1, wherein the image processing includes facial recognition.

4. The device of claim 3, wherein:
    the processor is configured to determine the user of the paired device from a plurality of users determined to be physically present relative to the paired device using the facial recognition.

5. The device of claim 1, wherein:
    the processor determines a second ambient condition from the device data and a categorization of the second ambient condition; and
    the processor adjusts a further visual characteristic of the avatar responsive to the second ambient condition, wherein the further visual characteristic indicates the categorization of the second ambient condition.

6. The device of claim 1, wherein the physical presence is determined based on audio processing of the device data from the paired device.

7. The device of claim 6, wherein the audio processing includes human voice detection.

8. The device of claim 1, further comprising:
    a camera configured to capture visual data of surroundings of the device;
    wherein the communication circuitry is further configured to send the visual data to the paired device.

9. The device of claim 8, wherein:
    during a video call, the processor is configured to determine a direction a user of the device is looking based on image processing of the visual data captured by the camera of the device, and adjust a position of a window within a field of view of video received from the paired device responsive to the determined direction the user is looking, wherein the window defines a portion of the field of view of the video received from the paired device displayed on the screen of the device.

10. The device of claim 1, wherein:
the screen displays video received from the paired device during a video call and overlays a graphic on the video during the video call responsive to a user input detected from the user of the paired device; and
the graphic is specified by the user input.

11. A method of communication, comprising:
receiving, using a processor of a first device, device data from a second device paired with the first device;
determining, using the processor, a first ambient condition comprising physical presence of a user of the second device in relation to the second device based on image processing of the device data from the second device;
displaying, on a screen of the first device, an avatar of the user of the second device; and
adjusting a visual characteristic of the avatar on the screen responsive to the physical presence;
wherein the visual characteristic of the avatar is adjusted on the screen of the first device prior to establishing a video call between the first device and the second device.

12. The method of claim 11, wherein the device data specifies a change in distance between the user and the second device, and adjusting a visual characteristic further comprises:
adjusting the visual characteristic of the avatar responsive to the change in distance.

13. The method of claim 11, wherein the image processing includes facial recognition.

14. The method of claim 13, further comprising:
determining the user of the second device from a plurality of users determined to be physically present relative to the second device using facial recognition.

15. The method of claim 11, further comprising:
determining a second ambient condition from the device data and a categorization of the second ambient condition; and
adjusting a further visual characteristic of the avatar responsive to the second ambient condition, wherein the further visual characteristic indicates the categorization of the second ambient condition.

16. The method of claim 11, wherein the physical presence is determined based on audio processing of the device data from the paired device.

17. The method of claim 16, wherein the audio processing includes human voice detection.

18. The method of claim 11, further comprising:
capturing visual data of surroundings of the first device using a camera; and
sending the visual data to the second device.

19. The method of claim 18, further comprising:
during a video call, determining a direction a user of the first device is looking based on image processing of the visual data captured by the camera of the first device; and
adjusting a position of a window within a field of view of video received from the second device responsive to the determined direction the user is looking, wherein the window defines a portion of the field of view displayed on the screen of the first device.

20. The method of claim 11, further comprising:
displaying video received from the second device during a video call; and
overlaying a graphic on the video during the video call responsive to a user input detected from the user of the second device, wherein the graphic is specified by the user input.

* * * * *